(12) United States Patent
Neugebauer et al.

(10) Patent No.: US 8,908,693 B2
(45) Date of Patent: Dec. 9, 2014

(54) FLOW KEY LOOKUP INVOLVING MULTIPLE SIMULTANEOUS CAM OPERATIONS TO IDENTIFY HASH VALUES IN A HASH BUCKET

(71) Applicants: Rolf Neugebauer, Cambridge (GB); Gavin J. Stark, Cambridge (GB); Espen Skoglund, Cambridge (GB)

(72) Inventors: Rolf Neugebauer, Cambridge (GB); Gavin J. Stark, Cambridge (GB); Espen Skoglund, Cambridge (GB)

(73) Assignee: Netronome Systems, Incorporated, Santa Clara, CA (US)

( * ) Notice: Subject to any disclaimer, the term of this patent is extended or adjusted under 35 U.S.C. 154(b) by 186 days.

(21) Appl. No.: 13/690,195

(22) Filed: Nov. 30, 2012

(65) Prior Publication Data

US 2014/0153571 A1    Jun. 5, 2014

(51) Int. Cl.
*H04L 12/56* (2006.01)
*H04L 12/743* (2013.01)

(52) U.S. Cl.
CPC ......... *H04L 45/7457* (2013.01); *H04L 45/7453* (2013.01)
USPC ............ 370/392; 370/230; 370/401; 709/242

(58) Field of Classification Search
CPC ... H04L 45/7453; H04L 29/06; H04L 45/125; H04L 63/0254; H04L 69/22; H04L 63/1408; H04L 45/00; G06F 17/30949; G06F 17/30955; G06F 12/0897
USPC ........... 370/237, 378, 395.32, 230, 231, 235, 370/235.1, 389–392, 400–401, 428–429, 370/470–471; 709/212, 238–242; 711/122
See application file for complete search history.

(56) References Cited

U.S. PATENT DOCUMENTS

| 7,215,641 | B1 * | 5/2007 | Bechtolsheim et al. | 370/235 |
| 2011/0060876 | A1 * | 3/2011 | Liu | 711/108 |
| 2011/0246489 | A1 * | 10/2011 | Pope et al. | 707/754 |
| 2013/0343377 | A1 * | 12/2013 | Stroud et al. | 370/389 |

* cited by examiner

*Primary Examiner* — Bob Phunkulh
*Assistant Examiner* — Rose Clark
(74) *Attorney, Agent, or Firm* — Imperium Patent Works; T. Lester Wallace; Mark D. Marrello (57) ABSTRACT

A flow key is determined from an incoming packet. Two hash values A and B are then generated from the flow key. Hash value A is an index into a hash table to identify a hash bucket. Multiple simultaneous CAM lookup operations are performed on fields of the bucket to determine which ones of the fields store hash value B. For each populated field there is a corresponding entry in a key table and in other tables. The key table entry corresponding to each field that stores hash value B is checked to determine if that key table entry stores the original flow key. When the key table entry that stores the original flow key is identified, then the corresponding entries in the other tables are determined to be a "lookup output information value". This value indicates how the packet is to be handled/forwarded by the network appliance.

21 Claims, 8 Drawing Sheets

CAM-ASSISTED HASH TABLE LOOKUP

COMMUNICATION SYSTEM

FLOW PROCESSOR EXPANSION CARD

FIG. 5

NETWORK FLOW PROCESSOR INTEGRATED CIRCUIT

FIG. 6

ME ISLAND
FIG. 7

MU HALF ISLAND AND CACHE BLOCK

FIG. 8

FLOW KEY LOOKUP INVOLVING MULTIPLE SIMULTANEOUS CAM OPERATIONS TO IDENTIFY HASH VALUES IN A HASH BUCKET

TECHNICAL FIELD

The described embodiments relate generally to performing flow key lookups using hash tables and to related structures.

BACKGROUND INFORMATION

A conventional network switching appliance receives packets of a flow onto one of several input ports. For each packet, the switching appliance examines parts of the headers of the packet, and from these headers determines the flow to which the packet belongs. For each such flow, the switching appliance has been preconfigured so that it will output packets of that flow onto the predetermined one of the output ports. Once the flow of a packet has been identified, the switching appliance outputs the packet onto the appropriate output port in accordance with how the switching appliance has been preconfigured.

One type of conventional network switching appliance may operate to switch several millions of flows. The switching appliance may receive packets at a 10 Gbps rate or more on each of several input ports, and may output the packets onto several output ports at a 10 Gbps rate or more onto each of one or more output ports. In such a switching appliance, the flow of a packet is determined by a flow key, where the flow key is a concatenation or a combination of the IP source address of the packet, the IP destination address of the packet, the TCP source port of the packet, the TCP destination port of the packet, and other parameters. These identifying values are extracted from the headers of an incoming packet and are concatenated or otherwise combined to form the flow key. A hash algorithm is then used to convert the flow key into a shorter hash value. The hash value is then used as an index into a hash table of hash entries. The hash algorithm may convert multiple different flow keys into the same hash value, so the hash table will be indexed the same way to point to the same hash entry despite the packets being of these different flows. The hash entry stores the full flow key, and also stores or points to or is otherwise associated with certain associated lookup information. The lookup information may, for example, indicate an output port of the switching appliance from which packets of the flow are to be output.

Once the hash value has been determined from the incoming packet, and once the hash value has been used to identify a hash entry in the hash table, then the flow key stored in the identified hash entry is extracted and is compared with the original flow key generated from the packet in order to determine whether the hash entry is the correct entry for the packet. If the hash entry is the correct hash entry for the packet, then the flow key stored in the hash entry will match the flow key from which the hash value was computed. If a second flow key results in a hash value that points to the same hash entry of the flow table, then the hash entry of the table points to a second hash entry for this second flow key. The second hash entry is not in the table per se, but rather is linked to the hash entry of the table to form a linked list of hash entries. If the flow key of the hash entry of the hash table has been checked and determined not to match the original flow key of the packet, then the second hash entry of the linked list is consulted. The flow key of this second hash entry is compared with the original flow key to determine if it matches. Depending on the particular flow keys of the particular flows, and depending on the hash table size and the hash algorithm used, some hash table entries may be empty, whereas others may be populated and may be the beginning of linked lists of hash entries.

Processing continues in this way checking the flow keys stored in the hash entries of the linked list until the flow key of a hash table entry is found to match the original flow key of the packet. When the match is found, the associated lookup information is extracted and is used to determine how to forward the packet. Ways are sought of improving this flow key to lookup information lookup operation in a switching appliance.

SUMMARY

A network appliance and a related method involve a hash table having hash buckets, where each hash bucket includes flag bit locations and a plurality of hash bucket entry fields. In one example there is a set of flag bit locations for each hash bucket entry field. A packet (for example, an IP packet) is received onto the network appliance. From various fields of headers of the packet, a flow key is determined that identifies the flow to which the packet belongs. In one example, the flow key is a concatenation of values including: at least a part of the IP source address of the packet, at least a part of the IP destination address of the packet, at least a part of the TCP source port of the packet, at least a part of the TCP destination port of the packet, at least a part of a MAC source address, at least a part of a MAC destination address, an application layer protocol identifier, and other values. In the case of IPv4, the flow key may be 64 bytes long. In the case of IPv6, the flow key may be 128 bytes long. A hash function is then applied to the flow key to generate two shorter values: 1) a first hash value A, and 2) a second hash value B. Each of these two hash values may be a 32-bit value. Hash value A (or a part of hash value A) is then used as an index into the hash table to identify a hash bucket.

Multiple simultaneous CAM lookup operations are then performed on the contents of the hash bucket entry fields of the identified hash bucket in order to determine which one or ones of the hash bucket entry fields stores the hash value B. The content of each hash bucket entry field is checked against the hash value B to determine if the hash bucket entry field stores the hash value B. A specialized transactional memory reads the hash bucket value from bulk storage into a cache memory if necessary and then performs the multiple simultaneous CAM lookup operations using hash value B, thereby outputting a plurality of CAM lookup output values all at the same time. The CAM lookup output value for a hash bucket entry field indicates whether the hash bucket entry field contains the hash value B. In some examples, the CAM lookup output value for a hash bucket entry field also includes the flag bit values associated with the hash bucket entry field.

For each of the populated hash bucket entry fields in the hash table there is a corresponding entry in a key table and there are also corresponding entries in other tables such as in an action table and in a statistics table. The key table entry corresponding to each hash bucket entry field that stores the hash value B is checked to determine if the key table entry stores the original flow key. When the key table entry that stores the original flow key is identified, then the corresponding entries in the other table or tables (for example, in the action table and in the statistics table) are identified and output as the "lookup output information value" of the overall flow key lookup operation. In one example, the lookup output information value includes an action value. The action value is a code that indicates how the packet is to be handled by the network appliance and/or how the packet is to be processed by the network appliance and/or how the packet is to be forwarded out of the network appliance. The packet is then handled and/or processed and/or forwarded out of the network appliance as indicated by the lookup output information value.

In one embodiment, when the key table entry that stores the original flow key is identified, then the associated flag bits (the flag bits of the CAM lookup output value associated with the key table entry that is determined to be a match to the original flow key) are used to determine how to handle/process/forward the packet. The flag bits encode and action or actions. A subsequent access of an action value part of the lookup output information value need not be performed because the flag bits encode the action to be performed, and because the flag bits are already available as part of the CAM lookup output value. Examples of actions that can be encoded in this way in the flag bits include: an action of sending the packet out of the network appliance unmodified, an action of dropping the packet and not sending the packet out of the network appliance, an action of sending the first packets of the flow to another processor for exception processing, an action that a Time To Live (TTL) field of an IP header should be decremented, and an action that a VLAN tag should be popped.

Further details and embodiments and techniques are described in the detailed description below. This summary does not purport to define the invention. The invention is defined by the claims

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
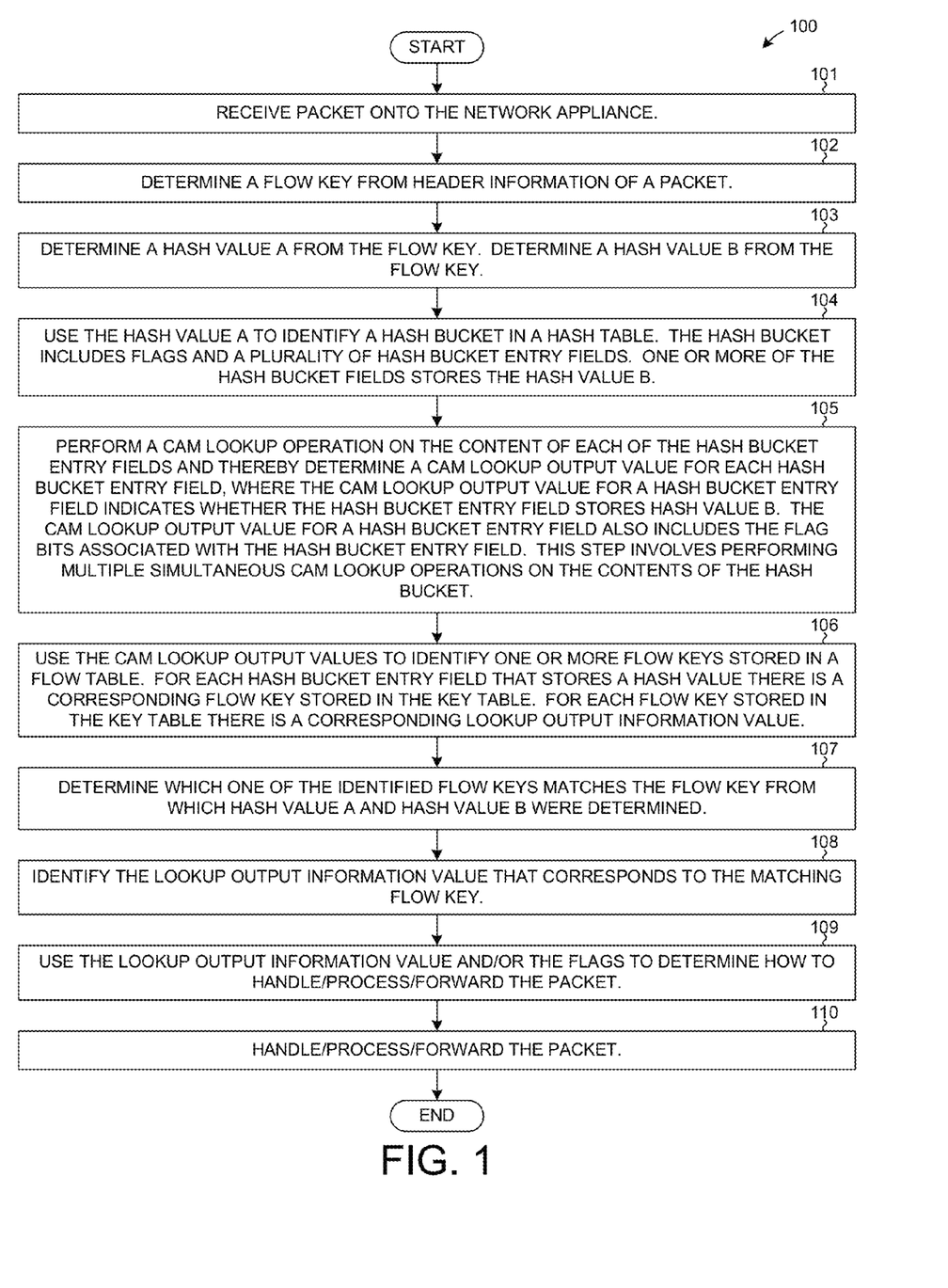
FIG. 1 is a flowchart of a CAM-assisted hash table lookup method 100 that is carried out by a novel network appliance 1 in accordance with one novel aspect.
Figure 2:
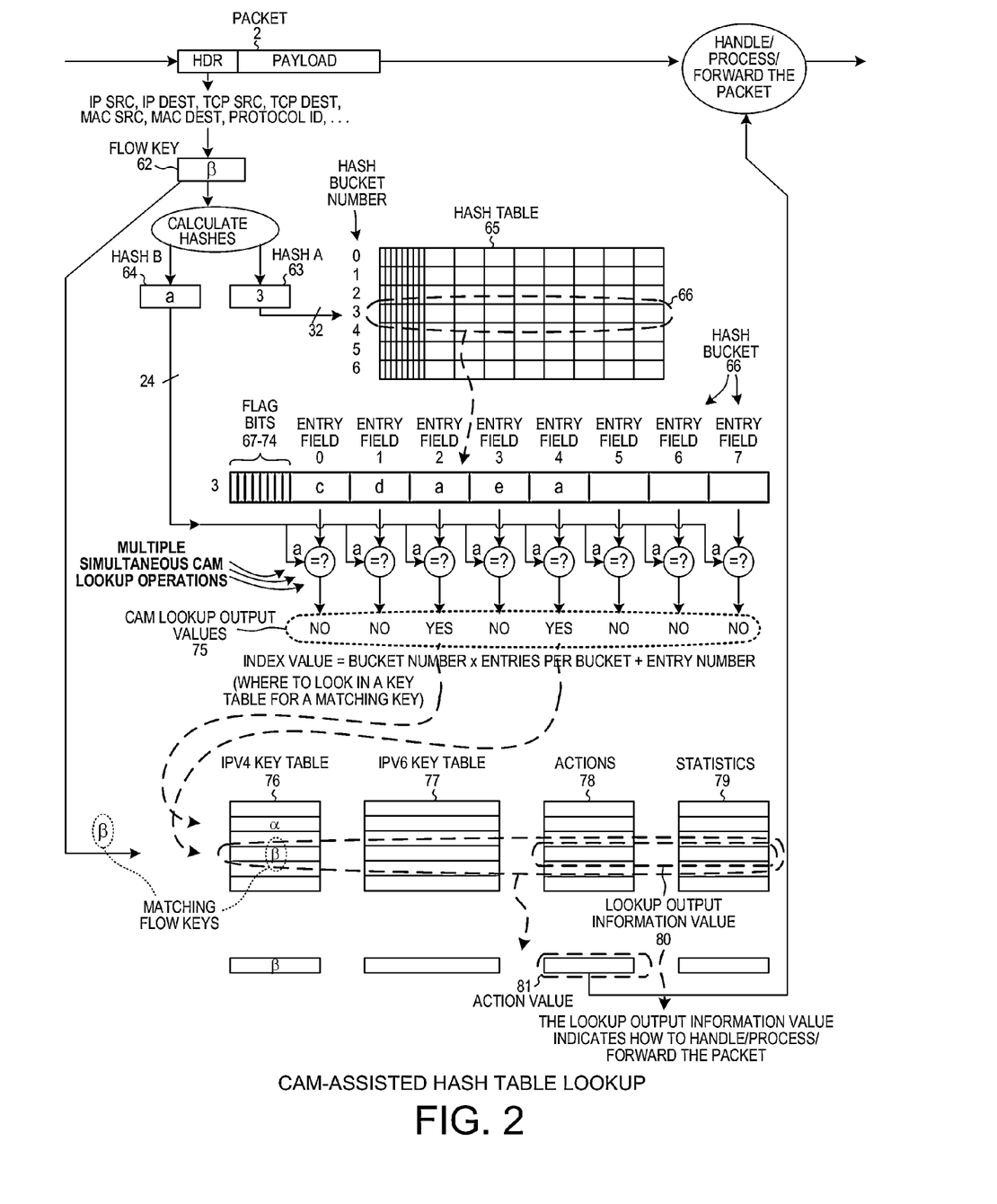
FIG. 2 is a schematic diagram that illustrates the method 100 of FIG. 1.
Figure 3:
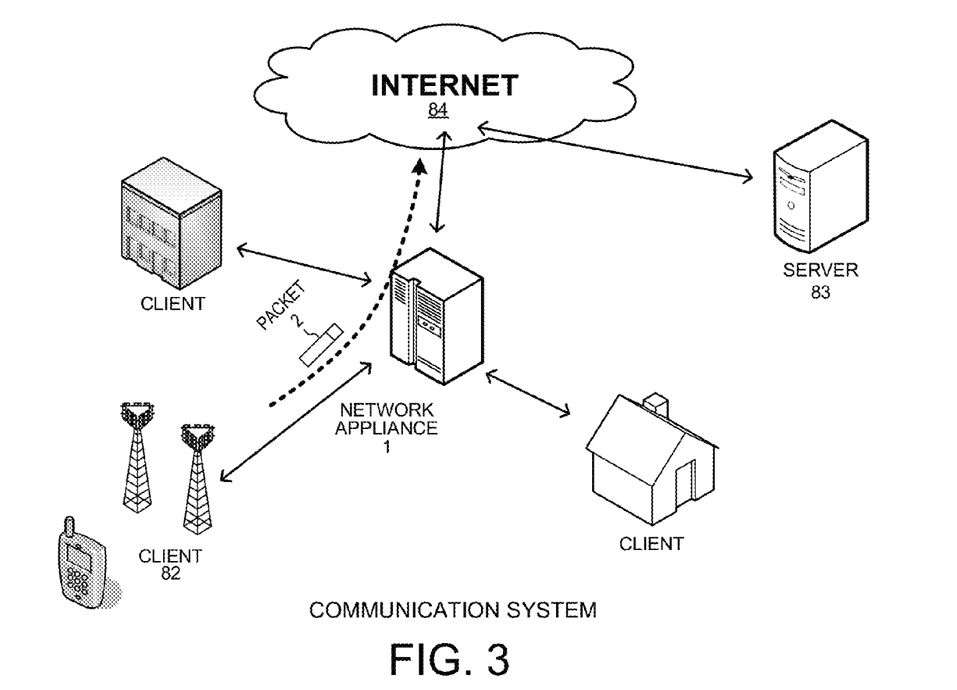
FIG. 3 is a diagram that illustrates a system in which network appliance 1 operates to carry out the method 100.

FIG. 1 is a flowchart of a method 100 that is carried out by a network appliance 1 in accordance with one novel aspect. FIG. 2 is a schematic diagram that illustrates the method 100 of FIG. 1. FIG. 3 is a diagram that illustrates a system in which the network appliance 1 operates to carry out the method 100. FIGS. 4-8 are hierarchical diagrams of the network appliance 1.

Figure 4:
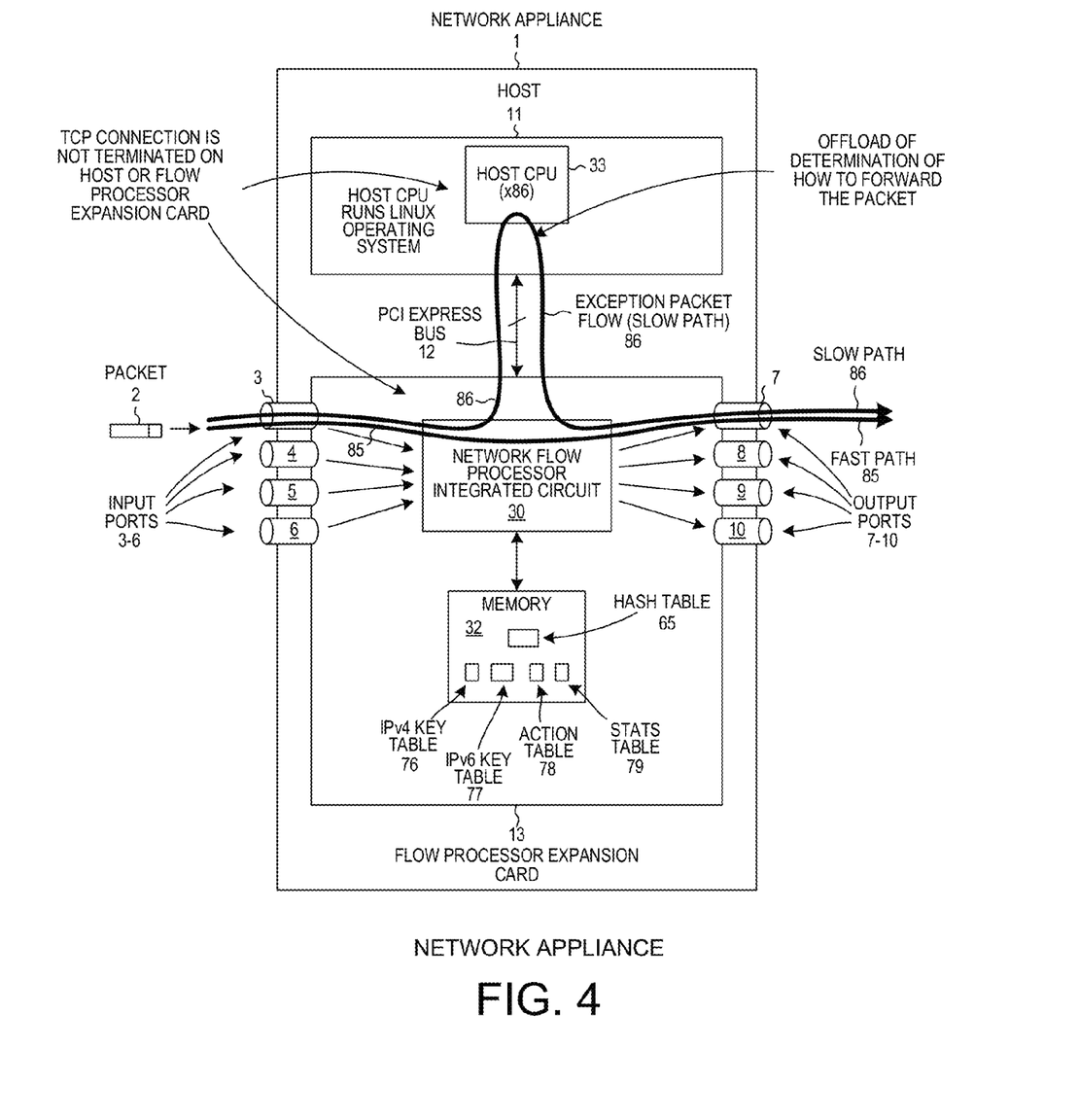
FIG. 4 is a schematic diagram of network appliance 1.
Figure 5:
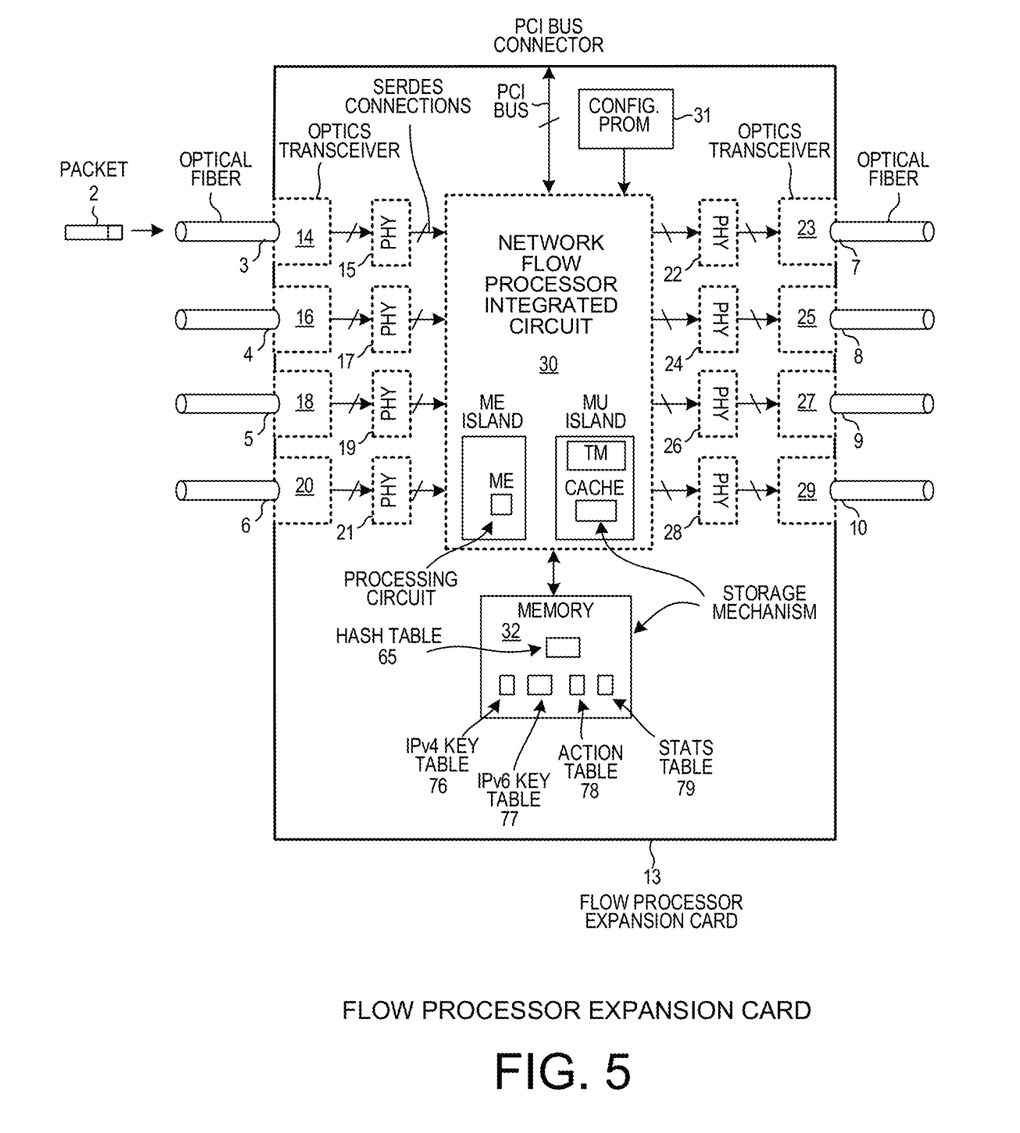
FIG. 5 is a more detailed diagram of the flow processor expansion card 13 within the network appliance 1 of FIG. 4.

In step 101, a packet 2 is received onto an input port 3 of network appliance 1. As shown in FIG. 4, network appliance 1 has multiple input ports 3-6 and multiple output ports 7-10. Network appliance 1 includes a host portion 11 that is connected via a high speed bus 12, such as a PCI express bus, to a flow processor expansion card portion 13. As shown in further detail in FIG. 5, flow processor expansion card portion 13 includes input port and output port circuitry 14-29, an island-based Network Flow Processor Integrated Circuit (NFPIC) 30, a configuration PROM 31, and external memory 32. The host portion 11 is typically a motherboard assembly that includes a host CPU (central processing unit) 33, memory, and other circuitry (not shown). The host CPU 33 executes an instance of the LINUX operating system.

Figure 6:
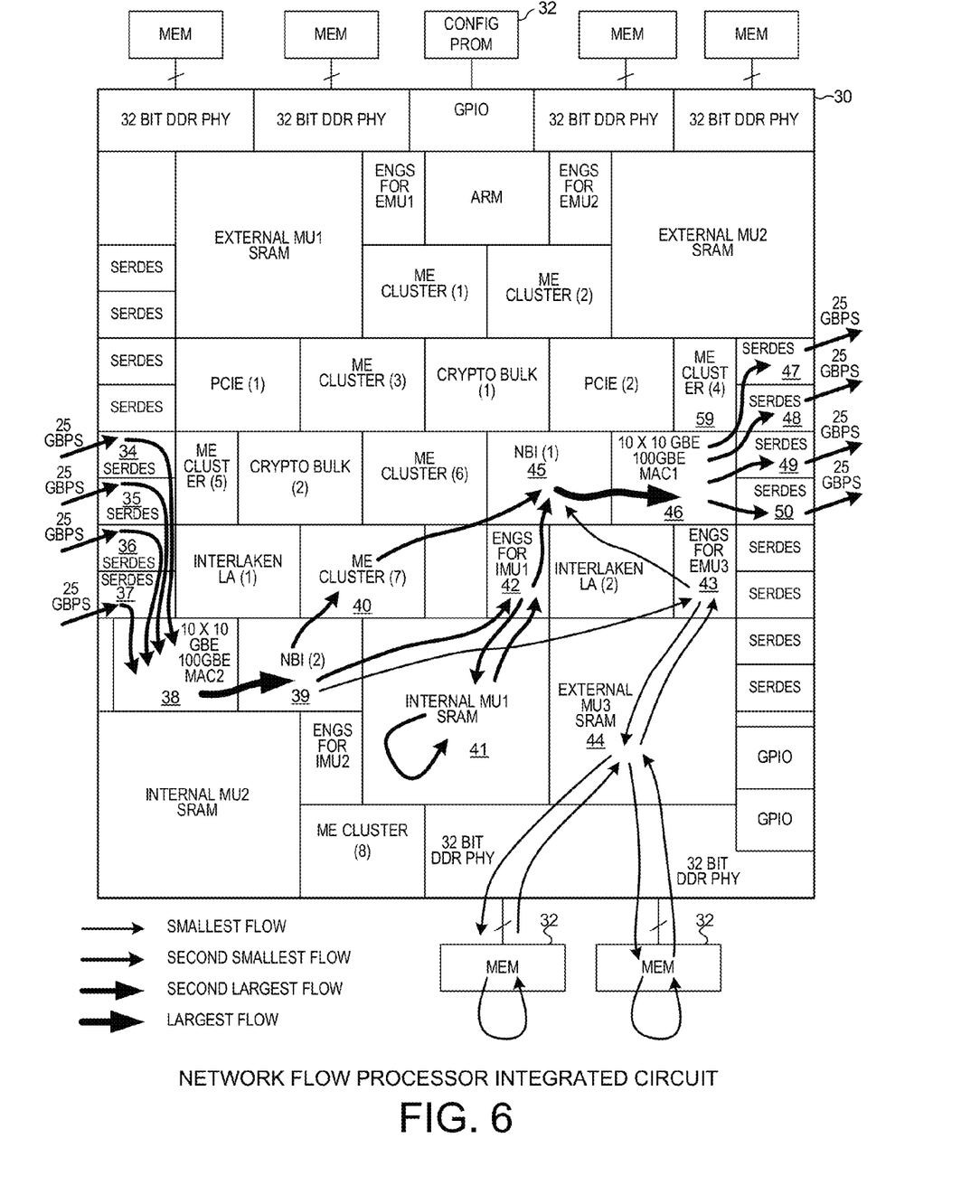
FIG. 6 is a top-down diagram of the network flow processor integrated circuit 30 on the flow processor expansion card 13 of FIG. 5.

FIG. 6 is a more detailed diagram of the network flow processor integrated circuit 30, configuration memory 31, and memory 32 of FIG. 2. Flows of packets pass through the various islands and blocks of the island-based integrated circuit 30 as indicated by the arrows of FIG. 6. Packet information from external PHY hardware pass into the integrated circuit 30 via SERDES blocks 34-37, and pass through a MAC island 38, and through an ingress NBI (NorthBound Interface) island 39. Headers of the packets generally pass to a microengine (ME) island 40, whereas the data payloads of the packets are generally stored into memory. Data payload information is put into internal SRAM memory block 41 via internal memory interface island 42. Data payload information is put into external DRAM memory 32 via external memory interface island 43 and block 44. After processing, the packet information passes through an egress NBI island 45, through an egress MAC island 46, and out of the integrated circuit 30 via SERDES blocks 47-50.

Figure 7:
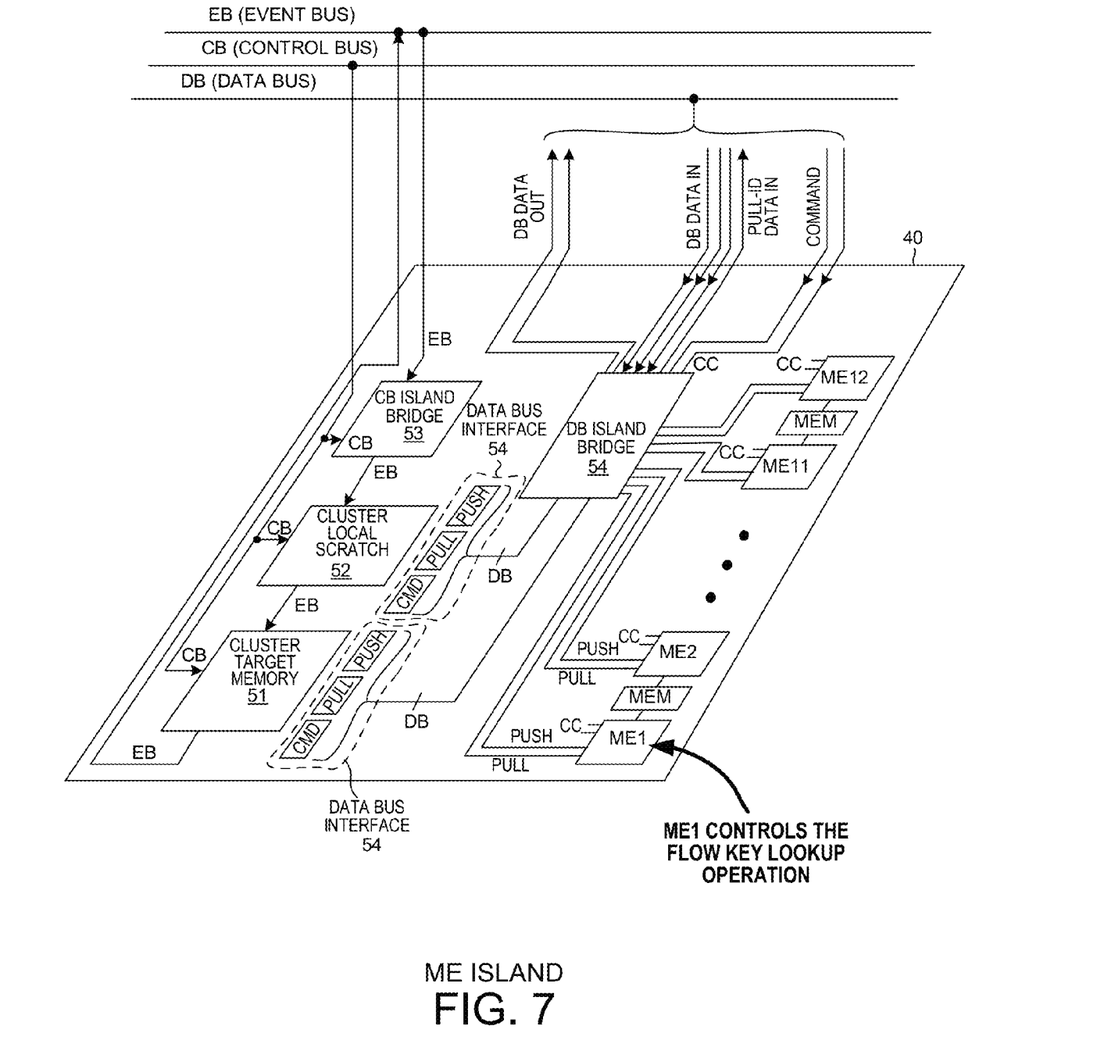
FIG. 7 is a conceptual perspective diagram of an ME island in the network flow processor integrated circuit 30 of FIG. 6.

FIG. 7 is a more detailed perspective schematic diagram of ME island 40 of FIG. 6. Among other parts, ME island 40 includes a several pairs of microengines ME1-ME12. Each pair of microengines shares an associated memory. In addition, ME island 40 includes a cluster target memory 51, a cluster local scratch 52, a control bus island bridge 53, and other bus interface circuitry 54.

Figure 8:
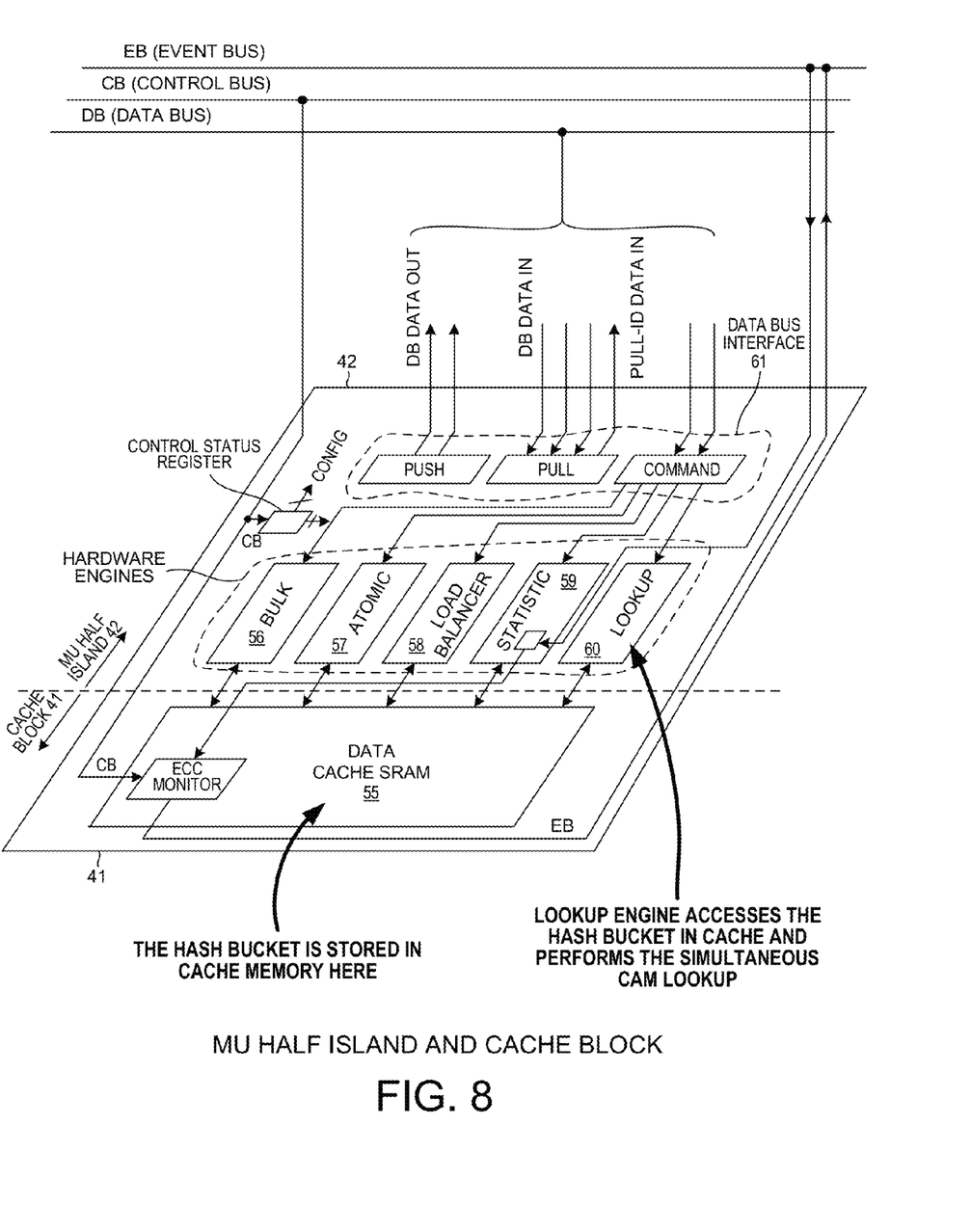
FIG. 8 is a conceptual perspective diagram of an MU half island and a cache block in the network flow processor integrated circuit 30 of FIG. 6.

FIG. 8 is a more detailed perspective schematic diagram of the MU half island 42 and cache block 41 of FIG. 6. Half island 42 and cache block 41 operate together as a transactional memory having several hardware engines and an amount of cache memory 55. The hardware engines include a bulk engine 56, an atomic engine 57, a load balancer engine 58, a statistics engine 59, and a lookup engine 60. The transactional memory can be accessed via bus interface circuitry 61. In one example, lookup engine 60 can perform a CAM (content addressable memory) lookup operation on the contents of cache memory 55. A microengine processor in ME island 40 can read the result of the CAM lookup operation across an interconnecting CPP (Command Push Pull) bus via bus interfaces 54 and 61. The external memory interface half island 43 and block 44 are of similar architecture to the architecture set forth in FIG. 8, except that the associated memory of the transactional memory is not internal to integrated circuit 30 (such as in block 41) but rather is external to integrated circuit 30 in external DRAM 32. For additional information on the Network Flow Processor Integrated Circuit (NFPIC) 30 of FIG. 6, see: U.S. patent application Ser. No. 13/399,324, filed Feb. 17, 2012, titled "Configurable Mesh Data Bus In An Island-Based Network Flow Processor", by Gavin J. Stark (the entire subject matter of which is incorporated herein by reference). The packet 2, that was received onto network appliance 1 in step 101, passes into NFPIC 30 such that the headers can be analyzed by a microengine in ME island 40.

In step 102, a flow key 62 is determined from header information of the packet 2. There are many way of making such a flow key 62 that will identify the flow. In one example, flow key 62 is a concatenation of: at least a part of the IP source address of the packet, at least a part of the IP destination address of the packet, at least a part of the TCP source port of the packet, at least a part of the TCP destination port of the packet, at least a part of a MAC source address, at least a part of a MAC destination address, an application layer protocol identifier, a VLAN tag, and other values that help identify the flow from other flows. The resulting flow key 62 has a value β and is shown in the upper left part of FIG. 2. In the case of the packet 2 being an IPv4 IP packet, the flow key 62 is 64 bytes long. In the case of the packet 2 being an IPv6 IP packet, the flow key 62 is 128 bytes long. In the present example, flow key 62 is determined by ME1 of FIG. 7 and is stored in local registers accessible to ME1.

In step 103, a hash value A 63 is determined from the flow key 62, and a hash value B 64 is also determined from the flow key 62. In the present example, hash value B is a 24-bit value of "a" and hash value A is a 32-bit value of "3". ME1 of FIG. 7 determines the hashes from the flow key.

In step 104, the hash value A 63 is used as an index into a hash table 65 to identify one of the hash buckets 66 in hash table 65. The hash table 65 is a list of hash buckets as illustrated in FIG. 2. There is only one hash table used. Part of the hash table 65 is stored in external memory 32 as illustrated in FIG. 4, whereas selected hash buckets of hash table 65 are cached in cache memory 55 of the transactional memory of the MU structure of FIG. 8. In the illustrated example, the hash buckets illustrated in FIG. 2 are present in cache memory 55 of the transactional memory. Before the steps of the method 100 of FIG. 1 occur, the host CPU 33 has previously set up the hash table 65 and its associated entries and other tables so that each flow will have an associated "lookup output information value" that indicates how to forward packets of that flow.

In the example of FIG. 2, hash value A 63 has a hash value of "3". This "3" points to the hash bucket 66 in hash table 65 that has a hash bucket number of "3". In the illustrated example, hash bucket 66, like all the other hash buckets, includes eight one-bit flags 67-74 and eight 24-bit hash entry fields. The hash bucket is one row of hash table 65. In FIG. 2, the eight hash entry fields are denoted "ENTRY FIELD 0", 'ENTRY FIELD 1", "ENTRY FIELD 2", and so forth. A given hash entry field can be empty, or can store a 32-bit hash value. In the example illustrated in FIG. 2, "ENTRY FIELD 0" stores a hash value "c", "ENTRY FIELD 1" stores a hash value "d", "ENTRY FIELD 3" stores a hash value "e", but "ENTRY FIELD 3" and "ENTRY FIELD 4" both store the hash value "a". This hash value "a" is the same value as hash value B 64 that was calculated from the flow key.

Although there are only eight flag bits 67-74 in the illustrated example of FIG. 2, in a typical embodiment there is actually one separate set of eight flag bits associated with each separate entry field. The set of eight flag bits for a hash bucket entry field is stored in eight contiguous bit locations immediately preceding the associated hash bucket entry field in the hash bucket. The transactional memory is programmable so that it examines the appropriate entry field bits and looks over the leading flag bits when it performs the CAM lookup operation. In one embodiment, for each hash bucket entry field that the transactional memory determines is storing a matching hash value B, the transactional memory returns the associated flag bits as part of the CAM lookup output values 75.

One of the flags for a hash bucket entry field is a IPv4/IPv6 flag. When this flag is set, the flow key 62 is a 64 byte flow key and an IPv4 key table 76 is used. When this flag is cleared, the flow key 62 is a 128 byte flow key and an IPv6 key table 77 is used. Note in FIG. 2 that the length of the flow keys stored in IPv6 key table 77 are longer than the length of the flow keys stored in IPv4 key table 76. In the present example, this IPv4/IPv6 flag bit for each hash bucket entry field of hash bucket 66 is set.

Next, in step 105, a CAM lookup operation is performed on the content of each of the hash bucket entry fields of the identified hash bucket 66. The CAM lookup operation for a hash entry field generates a "CAM lookup output value", illustrated here as a "YES" or a "NO". The CAM lookup output value indicates whether the hash value B 64 is being stored in the corresponding hash bucket entry field. Eight such CAM lookup operations are performed simultaneously in parallel, thereby generating eight corresponding CAM lookup output values 75. In the illustrated example, ME1 in ME island 40 instructs the transactional memory in half island 42 and block 41 to perform the CAM lookup operation on the hash bucket 66 that is cached in the cache memory 55. ME1 supplies the hash B value to the transactional memory across the CPP bus as part of the command. The CAM lookup operation is then performed by the lookup engine 60 of the transactional memory. The resulting CAM lookup output values for ENTRY FIELD 2 and for ENTRY FIELD 4 both are "YES" values because the hash values "a" stored in these entry fields of hash bucket 66 match the "a" value of hash value B 64.

In step 106, the CAM lookup output values 75 are used to identify one or more flow keys stored in IPv4 flow table 76. For each hash bucket entry field that stores a hash value there is a corresponding flow key storage position in one of the key tables 76 and 77. For each flow key stored in a key table there is also a corresponding "lookup output information value". In the example of FIG. 2, this correspondence is illustrated by the "lookup output information value" being in the same row as its flow key stored in a key table. The "lookup output information value" includes an "action value" stored in an actions table 78 and a statistics value stored in a statistics table 79. The hash table 65 and the other associated tables 76-79 are sometimes referred to together as a "flow table" or as a "flow table data structure".

In the example of FIG. 2, the CAM lookup output value for ENTRY FIELD 2 identifies a flow key α in key table 76. Similarly, the CAM lookup output value for ENTRY FIELD 4 identifies a flow key β in key table 76. The index into the key table 76 is given by multiplying the bucket number by the number of entries in the bucket, and then adding the entry field number. In the present example, the key tables 76 and 77, the actions table 78 and the statistics table 79 are stored in external memory 32 but parts of these tables are cached in cache memory 55 of the transactional memory of FIG. 8. ME1 issues commands across the CPP bus to the transactional memory to identify those flow key entries in the key table that are pointed to by the "YES" CAM lookup output values 75.

In step 107, which one of the identified flow key entries that matches the flow key 62 is determined. The value β is compared to each of the identified flow key entries from the key table 76. In the example of FIG. 2, the original flow key 62 has a value of β. This flow key β matches the flow key value β of the lower one of the two identified key table entries. In one example, ME1 issues commands across the CPP bus to the transactional memory to read the associated flow keys into the ME island for comparison.

In step 108, the "lookup output information value" that corresponds to the matching flow key entry is identified. This "lookup output information value" is identified in FIG. 2 with reference numeral 80. In one example, the identified "lookup output information value" 80 from cache memory 55 is communicated from the transactional memory of FIG. 8, across the CPP bus, and to ME1 of FIG. 7.

In step 109, the "lookup output information value" 80 is used by ME1 to determine how to handle and/or process and/or forward the packet 2. In the example of FIG. 2, lookup output information value 80 indicates one of the output ports 7-10 of the network appliance from which the packet 2 should be transmitted. In addition, lookup output information value 80 indicates an action value 81. The action value 81 is a code that indicates one of a plurality of actions to be taken with respect to the packet 2. In one example: a code of "1" indicates the action of sending the packet out of the network appliance unmodified; a code of "2" indicates the action of dropping the packet and not sending the packet out of the network appliance; a code of "3" indicates the action of sending the first predetermined number of packets of the flow to the host for exception processing; a code of "4" indicates that the time to live (TTL) field of the IP header should be decremented; and a code of "5" indicates that the VLAN tag should be popped.

In step 110, the packet 2 is handled and/or processed and/or forwarded in accordance with the lookup output information value 80. ME1 of FIG. 7 performs any processing on packet 2 as indicated by lookup output information value 80. In the present example as illustrated in FIG. 3, packet 2 originated in a client 82, passed into network appliance 1 via input port 3, passed through network appliance 1, passed out of network appliance 1 via output port 7, and was forwarded on its way to a server 83 via a node in internet 84. The IP source address is in client 82 and the IP destination address is in server 83. The flow is one of two flows involved in a TCP connection, and the TCP connection is not terminated anywhere in network appliance 1. In the example described above, the packet 2 passes through the network appliance 1 in a fast path 85. The fast path 85 is illustrated in FIG. 4. In another example, a packet of another flow results in a "3" action value being retrieved from the actions table 78. The packet of the other flow is therefore forwarded to host portion 11 of the network appliance across the PCI express bus 21. Thereafter, the host portion 11 processes the packet, and determines how the packet will be output from the network appliance. The packet is returned to the flow processor expansion card 13 via the PCI express bus 12, and is output from an output port as directed by the host portion 11. This path 86 is referred to as the "slow path".

In one advantageous aspect, the number of flow table memory accesses necessary to carry out a "flow key" to "lookup output information value" operation is smaller in the method 100 of FIG. 1 as compared to a conventional flow key lookup operation involving linked lists of entries as described above in the background information section of this patent document. In the case of the target entry being at the end of a linked list of entries, many memory accesses would be required to sequentially read and examine the flow keys stored in the various entries of the linked list until the matching flow key is eventually found. In method 100 of FIG. 1, on the other hand, the hash bucket is read and analyzed in a single simultaneous CAM lookup operation. If only one hash value stored in a hash bucket entry field matches the hash value B, then only one additional key table read operation is required to confirm that the flow key is present in the key table. This is normally the case because the hash value B generally prevents hashing collisions. In the novel method, the hashing algorithm is such that hash value B seldom matches more than one hash bucket entry field value in the hash bucket.

In another advantageous aspect, the flag bits 67-74 of the hash bucket reduce the number of memory accesses necessary to carry out a flow key lookup operation and result in the corresponding action being known sooner than it would be were the conventional flow key lookup operation employed. In the conventional flow key lookup operation involving linked lists of entries as described above in the background information section of this patent document, several memory accesses may be required to examine flow keys in linked entries before the flow key is found in an entry, and thereafter an additional memory access is generally required to retrieve lookup information for the matching flow key entry. If the lookup information indicates an action to be taken, a substantial amount of delay may be involved before the action is determined. The reading of an actions table may also be a relatively slow memory access. In method 100 of FIG. 1, on the other hand, the flag bits are available at the time the hash bucket is accessed. An action or actions is/are indicated by the various flag bits so that the action or actions to be performed is/are known sooner in the flow key lookup process.

In one example, there is a separate set of flag bits associated with each separate hash bucket entry field. The flag bits for a hash bucket entry field are stored in bit locations in the hash bucket immediately preceding the associated hash bucket entry field. The flag bits for a hash bucket entry field together are an action code, where an action code of "1" indicates the action of sending the packet out of the network appliance unmodified, where an action code of "2" indicates the action of dropping the packet and not sending the packet out of the network appliance, where an action code of "3" indicates the action of sending the first predetermined number of packets of the flow to the host for exception processing, where an action code of "4" indicates that the time to live (TTL) field of the IP header should be decremented, and where an action code of "5" indicates that the VLAN tag should be popped. A selected action or actions is/are encoded in the flag bits for a hash bucket entry field, whereas ones of a larger number of possible actions can be encoded in the action value 81 of the action table. Because one or more of the selected actions is/are encoded in the flag bits and because the flag bits are returned by the transactional memory to the ME as part of the CAM lookup output values 75, the selected action or actions is/are known sooner than would be the case were the action only known upon a subsequent read of an action table. In some cases where the flags indicate the action to be taken, the handling/processing/forwarding of the packet as determined by the flags begins immediately after the determining of step 107. A subsequent reading of an action value from an action table as part of step 108 may not be necessary and may not be performed. The handling/processing/forwarding of the packet in step 110 occurs in accordance with the action encoded in the flags.

In another advantageous aspect, the size of the hash bucket is one cache line. Data read from DRAM 32 is read in the length of one or more cache lines. The simultaneous CAM lookup operation also operates on data the length of a cache line.

In another advantageous aspect, the transactional memory can be configured and used under software control to perform simultaneous 32-bit CAM lookup operations (no flags), or simultaneous 24-bit CAM lookup operations where the top eight bits of each 32-bit portion are used as flags, or simultaneous 16-bit CAM lookup operations where the top sixteen bits of each 32-bit portion are flags, or even simultaneous 8-bit CAM lookup operations where the top twenty-four bits are used as flags. In the examples described above, the transactional memory is used to perform simultaneous 24-bit CAM lookup operations where the upper eight bits of each 32-bit portion are flags. In addition, the number of hash bucket entries that are involved in the simultaneous CAM lookup operation is software configurable. The CAM lookup operation can operate on eight hash bucket entries as in the example described above, or the CAM lookup operation can operate on four, twelve, or sixteen entries.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method performed by a device that receives streams of packet data from another device and that performs actions on said packet data, comprising:
    (a) determining a hash value A and a hash value B from a flow key, wherein the flow key comprises at least a portion of an IP source address of a packet, at least a portion of an IP destination address of the packet, at least a portion of a TCP source port of the packet, and at least a portion of a TCP destination port of the packet;
    (b) using the hash value A to identify a hash bucket in a hash table, wherein the hash bucket includes a plurality of hash bucket entry fields, wherein the hash value B is stored in at least one of the hash bucket entry fields of the hash bucket;
    (c) performing a (Content Addressable Memory) CAM lookup operation on a content of each of the hash bucket entry fields thereby generating a CAM lookup output value for each of the hash bucket entry fields, wherein (c) involves performing a plurality of simultaneous CAM lookup operations, and wherein the CAM lookup output values generated in (c) identify which one or ones of the hash bucket entry fields store the hash value B;
    (d) using the CAM lookup output values generated in (c) to identify one or more flow keys stored in a key table, wherein each identified flow key corresponds to a hash bucket entry field that stores the hash value B, and wherein each flow key stored in the key table has a corresponding lookup output information value;
    (e) determining which one of the flow keys identified in (d) matches the flow key in (a); and
    (f) identifying the lookup output information value that corresponds to the one matching flow key determined in (e).

2. The method of claim 1, wherein (a) through (f) are performed by a device that performs actions on packets, wherein the lookup output information value is an action value, wherein the action value indicates one of a plurality of actions, the method further comprising:
    (g) performing the one of the plurality of actions on the packet, wherein the action performed is indicated by the action value, and wherein (g) is performed by the device.

3. The method of claim 1, wherein (a) through (f) are performed by a device that performs actions on packets, wherein the hash bucket further comprises a plurality of flag bit locations, wherein a multi-bit flag bit value is stored in the plurality of flag bit locations, wherein the multi-bit flag bit value indicates one of a plurality of actions, the method further comprising:
    (g) performing the one of the plurality of actions on the packet, wherein the action performed is indicated by the multi-bit flag bit value, and wherein (g) is performed by the device.

4. The method of claim 1, wherein (a) through (f) are performed by a device that performs actions on packets, wherein the hash bucket further comprises a flag bit location, wherein a flag bit value is stored in the flag bit location, wherein the flag bit value indicates one of a plurality of actions, the method further comprising:
    (g) performing the one of the plurality of actions on the packet, wherein the action performed is indicated by the flag bit, and wherein (g) is performed by the device.

5. The method of claim 4, wherein the action is to output the packet from the device without modifying the packet.

6. The method of claim 4, wherein the action is to drop the packet.

7. The method of claim 4, wherein the packet is a packet of a flow, and wherein the action is to transfer initial packets of the flow from a first processor of the device to a second processor of the device.

8. The method of claim 4, wherein the device has a fast path whereby packets pass through the device without being processed by a host processor, wherein the device has a slow path whereby packets are processed by the host processor, and wherein the action in (g) is to transfer the packet to the host processor for slow path processing.

9. The method of claim 1, wherein (a) through (f) are performed by a device that processes packets, wherein the hash bucket further comprises a flag bit location, wherein a flag bit value is stored in the flag bit location, the method further comprising:
    (g) using the flag bit value along with the lookup output information value identified in (f) to determine how to process the packet.

10. The method of claim 1, wherein the hash bucket is stored in a transactional memory, and wherein the transactional memory performs the plurality of simultaneous CAM lookup operations of (c).

11. The method of claim 1, wherein some of the hash bucket entry fields are empty and do not store hash values.

12. The method of claim 1, wherein (a) through (f) are performed by a device, wherein the key table is one of a plurality of key tables, wherein the hash bucket further comprises a flag bit location, wherein a flag bit value is stored in the flag bit location, wherein the flag bit value identifies one of the plurality of key tables.

13. The method of claim 1, wherein (a) through (f) are performed by a device, wherein the key table is one of a plurality of key tables, wherein one of the key tables stores key values a first length, wherein another of the key tables stores key values of a second length, wherein the hash bucket further comprises a flag bit location, wherein a flag bit value is stored in the flag bit location, wherein the flag bit value identifies one of the plurality of key tables.

14. A method performed by a device that receives streams of packet data from another device and that performs actions on said packet data, comprising:
    (a) determining a hash value A and a hash value B from a flow key, wherein the flow key comprises at least a portion of an IP source address of a packet, at least a portion of an IP destination address of the packet, at least a portion of a TCP source port of the packet, and at least a portion of a TCP destination port of the packet;
    (b) using the hash value A to identify a hash bucket in a hash table, wherein the hash bucket includes a plurality of hash bucket entry fields, wherein the hash bucket further comprises a set of flag bits for each of the hash bucket entry fields, wherein the hash value B is stored in at least one of the hash bucket entry fields of the hash bucket;

(c) performing a (Content Addressable Memory) CAM lookup operation on a content of each of the hash bucket entry fields thereby generating a CAM lookup output value for each of the hash bucket entry fields, wherein (c) involves performing a plurality of simultaneous CAM lookup operations, wherein the CAM lookup output values generated in (c) identify which one or ones of the hash bucket entry fields store the hash value B, and wherein the CAM lookup output values generated in (c) also include the flag bits for each hash bucket entry field that stores the hash value B;

(d) using the CAM lookup output values generated in (c) to identify one or more flow keys stored in a key table, wherein each identified flow key corresponds to a hash bucket entry field that stores the hash value B, and wherein each flow key stored in the key table has a corresponding lookup output information value;

(e) determining which one of the flow keys identified in (d) matches the flow key in (a);

(f) using flag bits of the CAM lookup output values generated in (c) to determine an action to perform on the packet; and (g) performing the action determined in (f) on the packet, wherein (a) through (g) are performed by a device that performs actions on packets.

15. The method of claim 14, wherein the hash bucket is stored in a transactional memory of the device, and wherein the transactional memory performs the plurality of simultaneous CAM lookup operations of (c).

16. The method of claim 15, further comprising:
(h) maintaining and storing an actions table, wherein the actions table includes action values indicating actions to be performed on packets, and wherein the action performed in (g) is not determined by an action value stored in the actions table but rather is determined by the flag bits used in (f).

17. The method of claim 16, wherein the action is to drop the packet.

18. A network appliance that receives streams of packet data from another device and that performs actions on said packet data, comprising:
a processing circuit adapted to determine a hash value A and a hash value B from a flow key, wherein the flow key comprises at least a portion of an IP source address of a packet, at least a portion of an IP destination address of the packet, at least a portion of a TCP source port of the packet, and at least a portion of a TCP destination port of the packet;

means for (a) using the hash value A to identify a hash bucket in a hash table, wherein the hash bucket includes a plurality of hash bucket entry fields,
wherein the hash bucket further comprises a set of flag bits for each of the hash bucket entry fields,
wherein the hash value B is stored in at least one of the hash bucket entry fields of the hash bucket, and
wherein the means is also for (b) performing a (Content Addressable Memory) CAM lookup operation on a content of each of the hash bucket entry fields thereby generating a CAM lookup output value for each of the hash bucket entry fields,
wherein the performing of the CAM lookup operation involves performing a plurality of simultaneous CAM lookup operations,
wherein the CAM lookup output values generated identify which one or ones of the hash bucket entry fields store the hash value B, and
wherein the CAM lookup output values generated also include the flag bits for each hash bucket entry field that stores the hash value B; and a storage mechanism that stores at least a part of a key table,
wherein the network appliance uses the CAM lookup output values to identify one or more flow keys stored in the key table,
wherein each identified flow key corresponds to a hash bucket entry field that stores the hash value B,
wherein each flow key stored in the key table has a corresponding lookup output information value, and
wherein the network appliance also identifies which one of the flow keys in the key table matches the flow key from which the hash values A and B were determined.

19. The network appliance of claim 18, wherein the network appliance uses the flag bits of the CAM lookup output values to determine an action to perform on the packet, and wherein the network appliance then performs the action on the packet.

20. The network appliance of claim 18, wherein the action is to transfer the packet to another processing unit of the network appliance for exception handling.

21. The network appliance of claim 18, wherein the processing circuit includes a processor that executes instructions, wherein the means is a transactional memory, and wherein the storage mechanism is an amount of memory.

* * * * *